Nov. 24, 1970   B. J. WALLIS   3,541,834
TRANSFER DIE MECHANISM FOR PRESSES
Filed July 17, 1968   4 Sheets-Sheet 1

INVENTOR
BERNARD J. WALLIS

ATTORNEYS

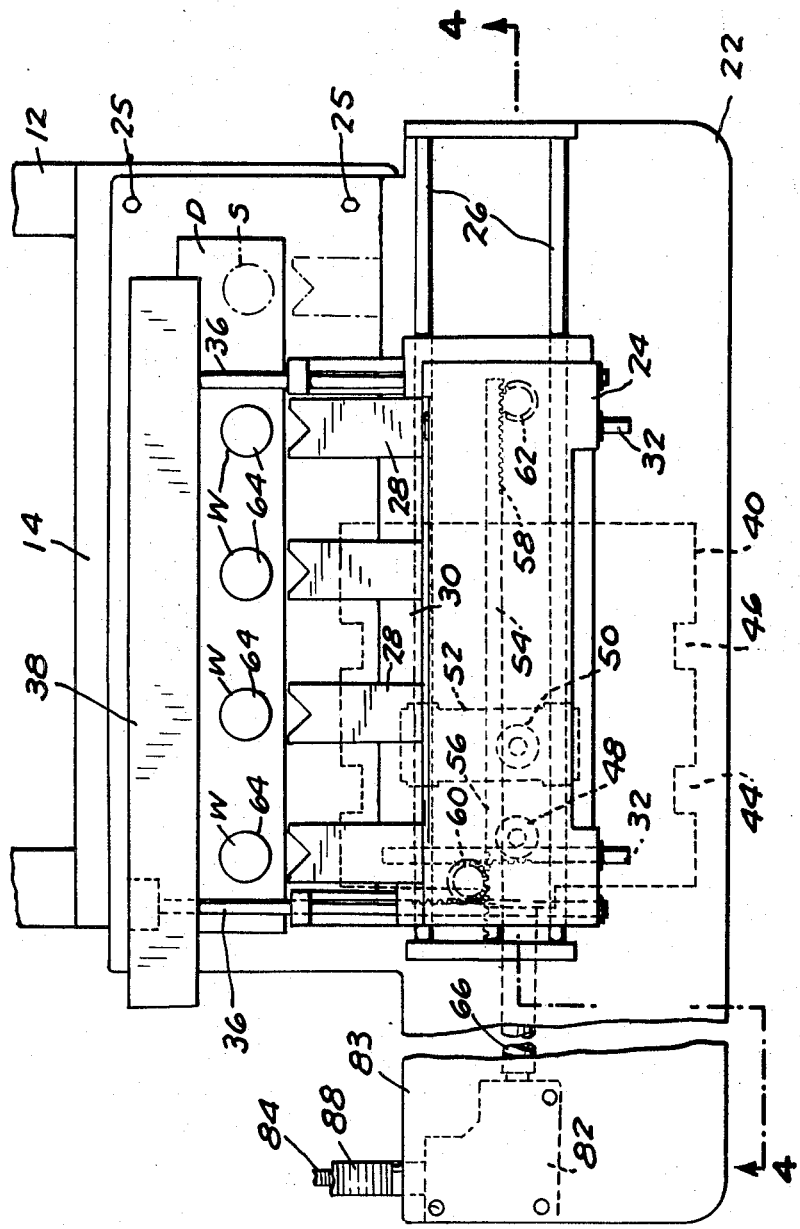

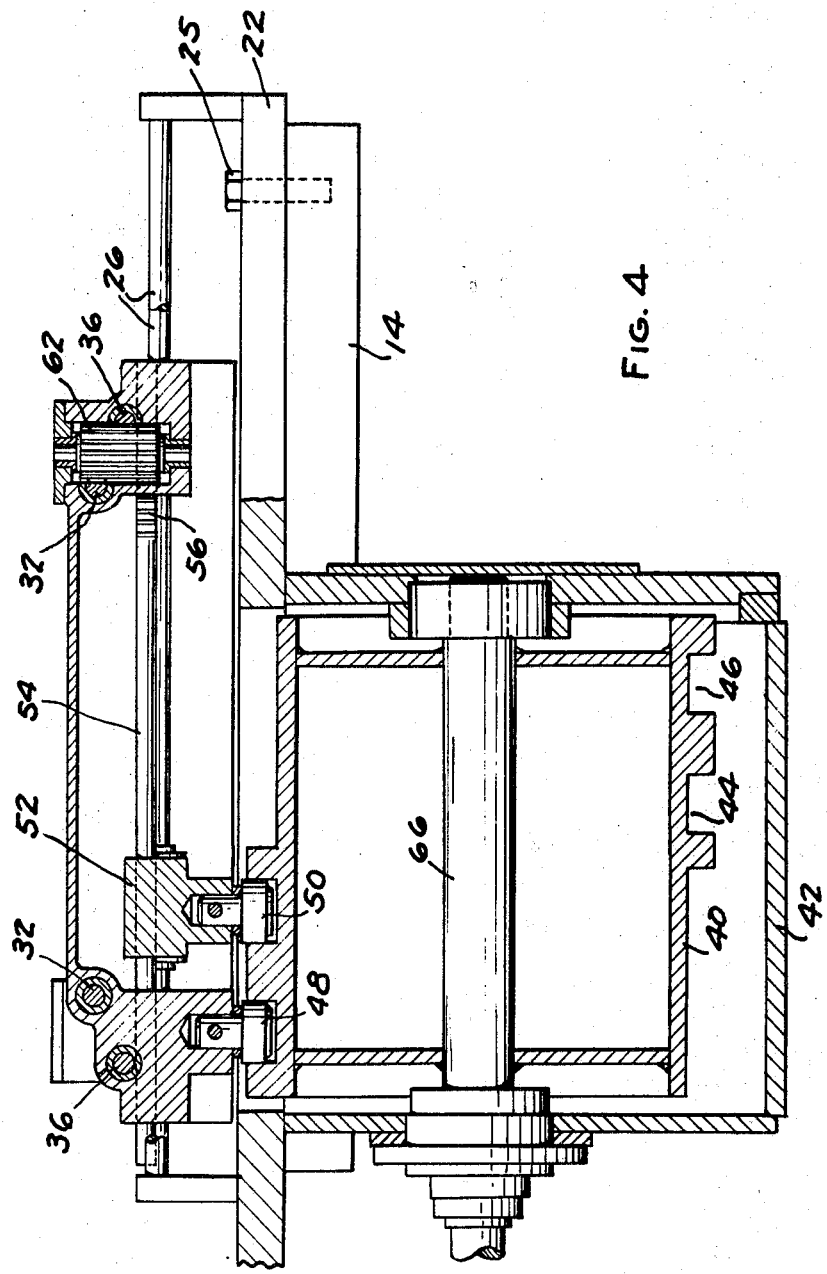

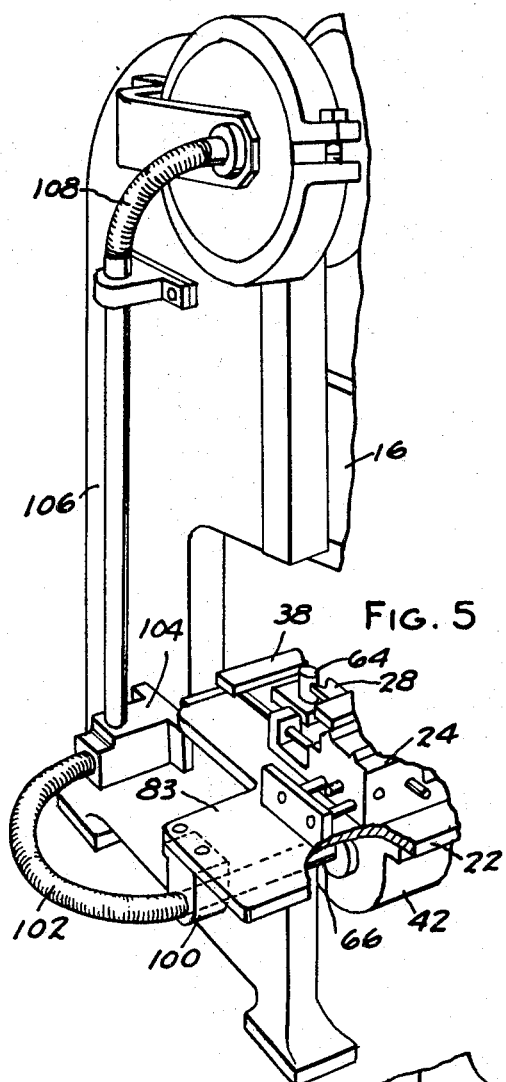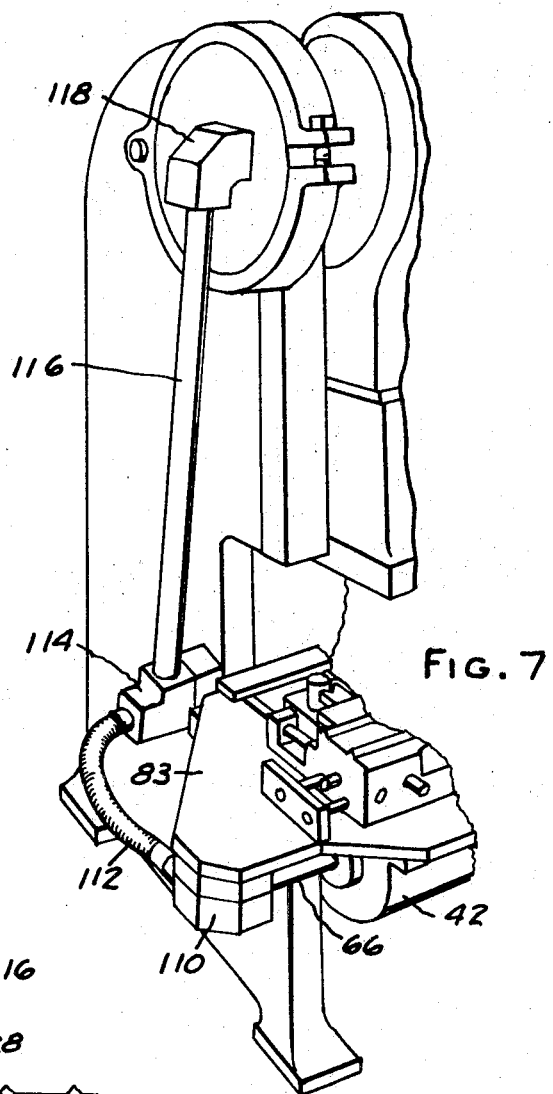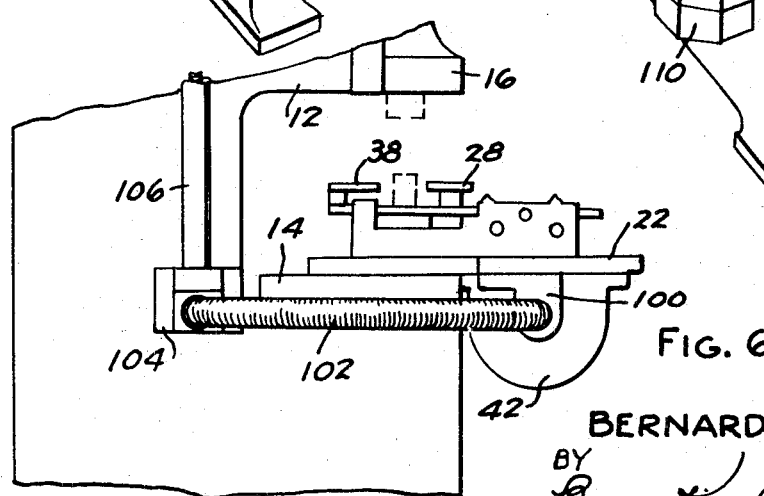

United States Patent Office 3,541,834
Patented Nov. 24, 1970

3,541,834
TRANSFER DIE MECHANISM FOR PRESSES
Bernard J. Wallis, c/o Livernois Engineering Co., 25200 Trowbridge Ave., Dearborn, Mich. 48021
Filed July 17, 1968, Ser. No. 745,432
Int. Cl. B21j 9/10; B21b 43/02
U.S. Cl. 72—405                                              10 Claims

ABSTRACT OF THE DISCLOSURE

A punch press provided with a transfer die mechanism removably mounted thereon and adapted to progressively index workpieces through successive stations of the transfer die in the press. The composite die and transfer mechanism is romovably mounted on the press and includes a reciprocating carriage with retractable work-engaging fingers thereon. The reciprocation of the carriage and actuation of the work-gripping fingers is effected by a rotary shaft on the transfer mechanism which is driven by a flexible drive shaft connected with a rotary shaft on the press driven at a speed in timed relation with the speed of rotation of the crank shaft of the press, the flexible drive shaft being of the type which has an outer flexible casing and a flexible torque transmitting core.

---

This invention relates to a composite die and workpiece transfer mechanism for punch presses and more particularly to an arrangement of this type which is readily installed in or removed from a press.

Many workpieces are formed to shape by successive stamping operations. Where conditions permit, such stampings are frequently formed on a punch press provided with a die having successive stations in which the workpieces are successively located. Where the quantity required of a particular progressively formed stamping is relatively high, it is common practice to provide the punch press with a transfer mechanism which automatically indexes the partially formed stampings through the successive stations of the die. In such an arrangement the speed of operation of the transfer mechanism must be carefully synchronized with the ram speed of the press. Normally this is accomplished by driving the transfer mechanism from an operating member of the press such as the ram or the crank shaft of the press.

Drive mechanisms heretofore employed for driving a transfer mechanism from an operating member of the press have usually presented problems which are both practical and economic in their nature. Such transfer mechanism drive arrangements have normally involved costly alterations of the press in order to accommodate a suitable drive for the transfer mechanism. The end result is that the press, for all practical purposes, is restricted to use with a particular transfer die mechanism and for the same reason the particular transfer die mechanism is restricted to use with a particular press.

In many instances such an arrangement is undesirable because a particular press ideally suited for producing other stampings cannot be readily utilized for production of such other stampings in the course of a production run on a stamping requiring a particular transfer die mechanism. Thus an inefficient and costly operation of the press results.

The object of the present invention resides in the provision of a transfer die mechanism which is adapted to be readily installed in or removed from a press and having a flexible drive for connection with the press which adapts the transfer die mechanism for use with various presses and which likewise enables a press to utilize different transfer die mechanisms.

More specifically the present invention involves the use of a transfer die mechanism designed so that the drive to the reciprocating carriage and fingers can be effected by a rotary shaft and a flexible drive shaft is connected between a rotary drive shaft of the press operating mechanism and the rotary drive shaft of the transfer die mechanism.

In the drawings:

FIG. 3 is a fragmentary plan view of the bed of the press shown in FIG. 1 with the transfer die mechanism thereon.

FIG. 4 is a sectional view along the line 4—4 in FIG. 3.

FIG. 5 is a fragmentary perspective view of a modified form of flexible drive arrangement in accordance with the present invention.

FIG. 6 is a fragmentary end view of the arrangement illustrated in FIG. 5.

FIG. 7 is a fragmentary perspective view of another form of flexible drive arrangement in accordance with the present invention.

Figure 1:
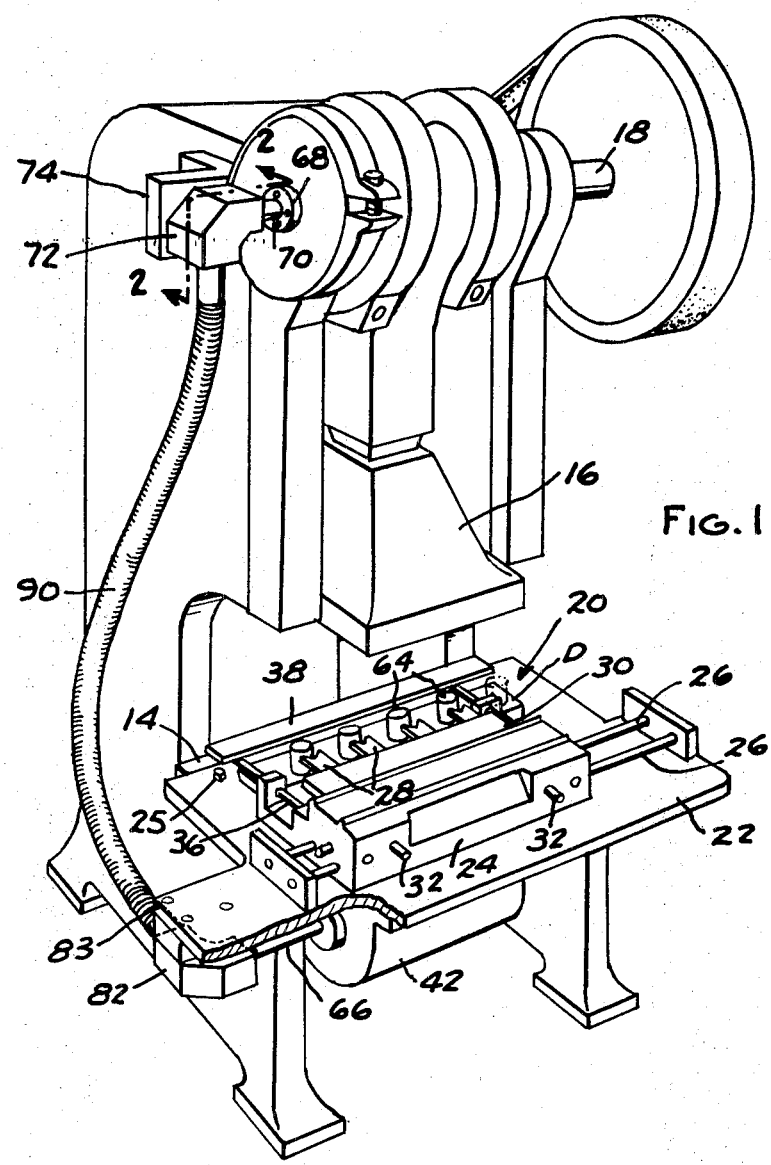
FIG. 1 is a perspective view of a punch press in which is mounted a transfer die mechanism provided with a drive according to the present invention.
Figure 2:
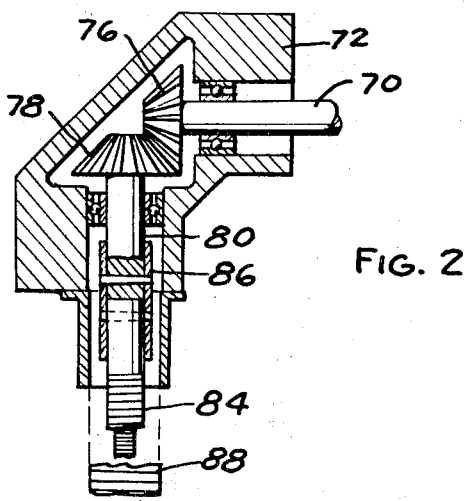
FIG. 2 is a fragmentary sectional view along the line 2—2 in FIG. 1.

In FIG. 1 a punch press is generally designated at 10. The press includes a conventional frame 12 provided with a bolster or bed plate 14 and a vertically reciprocating ram 16 which is crank driven from the drive shaft 18 of the press. In a press of this type drive shaft 18 is usually belt driven from an electric motor (not illustrated).

In the arrangement illustrated the punch assembly normally mounted on ram 16 is not shown. However there is illustrated a transfer mechanism generally designated 20 which includes a base plate 22 on which a carriage 24 is reciprocated. Base plate is fixedly mounted on the bed of the press as by screws 25. Carriage 24 is slideably mounted on base plate 22 by a pair of parallel guide rods 26. A plurality of work-gripping fingers 28 are mounted on carriage 24 and are adapted to be reciprocated to and from work-engaging position in a direction perpendicular to the path of travel of carriage 24 on guide bars 26. Referring to FIG. 3, it will be observed that the work-gripping fingers 28 are mounted on a finger bar 30 which is in turn supported at the ends of a pair of rods 32. Rods 32 are mounted on carriage 24 for reciprocation in a path transverse to the stroke of the carriage. Carriage 24 also supports a second pair of transversely shiftable rods 36 which are interconnected at their outer ends by a workpiece-engaging bar 38.

A die D is mounted on base plate 22 with its top face below the plane of fingers 28 and bar 38. In the arrangement illustrated die D has four working stations W and one discharge station S.

The means for operating the transfer mechanism in the embodiment illustrated comprises a barrel cam 40 journalled for rotation within casing 42 on the underside of the portion of base plate 22 which overhangs the front edge of bed 14. This type of drive for a transfer mechanism is disclosed in detail in U.S. Pat. No. 3,381,793. Barrel cam 40 has a pair of cam tracks 44, 46 which are engaged by two cam followers 48, 50. Cam follower 48 is mounted directly on carriage 24. Cam follower 50 is mounted on a crosshead 52 which is slidably supported on guide rods 26 and which is fixedly connected with an axially reciprocable finger bar actuating rod 54 on carriage 24. Adjacent its opposite ends actuating rod 54 is formed with gear rack portions 56, 58 which engage pinions 60, 62 journalled on carriage 24. The inner ends of rods 32, 36 are likewise formed with gear rack portions (not specifically illustrated) which mesh with diametrically opposite teeth on pinions 60, 62.

With the barrel cam drive illustrated in FIGS. 3 and 4 when cam follower 48 is shifted axially of barrel cam 40 by reason of rotation of the cam and the configuration of track 44, the carriage is shifted axially on guide bars 26. When cam follower 50 is shifted axially on the barrel cam 40 relative to the cam follower 48 by reason of the configuration of cam track 46, actuating rod 54 is reciprocated axially relative to carriage 24, thus causing rotation of pinions 60, 62 in opposite directions. Pinions 60, 62 rotate in opposite directions because they are located on opposite sides of actuating rod 54. Rotation of the two pinions 60, 62 in opposite directions will cause the rods 32 and rods 36 to likewise reciprocate in opposite directions so that the work-gripping fingers 28 and the bar 38 will shift toward and away from each other. Cam tracks 44, 46 have a configuration such that the work-gripping fingers 28 and bar 38 first shift toward one another to engage the workpieces, designated 64. Thereafter carriage 24 is shifted in a direction toward the right as viewed in FIG. 3 a distance corresponding to the distance between successive stations to thereby index each workpiece in die D to the next successive station. The ram 16 then descends so that the punch (not illustrated) cooperates with die D to shape the workpieces. On the up stroke of the ram the work-gripping fingers 28 and bar 38 are shifted away from each other to release the workpieces. Thereafter the carriage retracts to the start position shown in FIG. 3. This rectangular motion of fingers 28 and bar 38 is accomplished by rotation of shaft 66 on which the barrel cam 40 is mounted.

It follows that the speed of operation of the transfer mechanism must correspond with the speed of reciprocation of ram 16 so that the stroke of the ram is synchronized with the motion of fingers 28 and bar 38. Thus it is desirable to drive shaft 66 from the crank shaft 18 of the press. The present invention involves the use of a flexible drive shaft operatively connected between the crankshaft 18 and the driven shaft of the transfer mechanism. Such an arrangement is not only economical but at the same time requires little or no alteration of the press itself to accommodate the press for different transfer die mechanisms. In the embodiment illustrated in FIG. 1, the crankshaft 18 of the press has a coupling 68 attached to one end thereof. Coupling 68 is connected to a stub shaft 70 which extends into a gear box 72 mounted on the press by a bracket 74. The inner end of stub shaft 70 is provided with a bevel pinion 76 which meshes with a second bevel pinion 78 at the inner end of a second stub shaft 80 within gear box 72. A similar gear box 82 is mounted on the underside of an extension 83 of base plate 22 so that it receives the end of drive shaft 66 for barrel cam 40. Stub shaft 80 is connected to a flexible torque transmitting cable 84 by means of a coupling 86. The arrangement within the other gear box 82 is similar to that shown and described for the gear box 72 with a pinion on the end of drive shaft 66 meshing with a pinion coupled to the other end of cable 84. Cable 84 is of the conventional wire constructed type for transmitting torque while remaining flexible. Cable 84 is enclosed with a flexible outer sheath 88 connected at one end to gear box 72 and at its other end to gear box 82. Cable 84 and sheath 88 form a flexible drive shaft 90.

With the above-described arrangement it will be observed that by reason of the flexible drive shaft connection between crankshaft 18 and the drive shaft 66 for barrel cam 40 the transfer mechanism operates at a speed corresponding to the speed of operation of the press. This flexible drive connection between drive shaft 18 and drive shaft 66 does not require any extensive modification of the press. It merely requires the mounting of the gear box 72 on the press and the coupling of the crankshaft 18 with the stub shaft 70 and the coupling of the drive shaft 66 with a suitable stub shaft within gear box 82. It also follows that with the above-described arrangement in the event that the press illustrated has to be utilized for production of a different part, even temporarily, this would simply require the removal of the composite die and transfer mechanism from the press and disconnecting the flexible cable drive from gear box 72. By the same token the whole transfer die mechanism could be mounted on a different press and the flexible drive shaft connected with the crankshaft of the second press in the simple manner illustrated in FIG. 1 with a minimum expenditure of time and money.

In FIGS. 5, 6 and 7 modified forms of flexible drives for operatively connecting a transfer die mechanism with a press are illustrated. In FIGS. 5 and 6 the outer end of rotary shaft 66 which drives the transfer mechanism is journalled on the underside of extension 83 by a bracket 100 and is connected to one end of a flexible drive shaft 102. The other end of drive shaft 102 extends into a gear box 104 mounted on the press and is operatively connected by gears or the like with a vertically extending shaft 106 on the press. The upper end of shaft 106 is journalled in a pillow block 107 on the press and is connected by another flexible drive shaft 108 with the stub shaft 70 coupled to the end of the crankshaft of the press. With the arrangement illustrated in FIGS. 5 and 6 when it becomes necessary to remove the transfer die mechanism from the press the screws which mount the base plate 22 on the bed 14 of the press are removed and the flexible drive shaft 102 is disconnected from either gear box 104 or the end of shaft 66. If a different transfer die mechanism is to be employed in the press, flexible drive shaft 102 would be simply disconnected from shaft 66 and reconnected to the equivalent shaft on the transfer die mechanism to be mounted within the press.

A further modified arrangement is shown in FIG. 7 wherein a gear box 110 is mounted on the underside of extension 83 of base plate 22. Shaft 66 extends into gear box 110 and is operatively connected by suitable bevel gears (not illustrated) with one end of a short flexible shaft 112 which also extends at one end into gear box 110. The other end of flexible drive shaft 112 extends into a gear box 114 on the press and is connected by suitable gearing therein with an upright drive shaft 116. The upper end of drive shaft 116 extends into a gear box 118 in which suitable gearing is arranged for driving shaft 116 from the crankshaft of the press. As is the case with the other embodiments illustrated, the transfer die mechanism illustrated in FIG. 7 can be removed from the press by simply removing the screws which secure base plate 22 to the bed 14 and by disconnecting the flexible drive shaft 112.

In the arrangement illustrated in FIGS. 5, 6 and 7 it will be observed that the flexible drive shafts designated 102 and 112 are substantially shorter in length than the flexible drive shaft 90 shown in FIG. 1. As a matter of fact, the rigid shafts 106 and 116 have a length at least equal to the flexible drive shafts 102 and 112, respectively. In some instances, particularly where heavy torque loads are applied to the flexible drive shafts, it is desirable to reduce their length in order to minimize any possible "wind up" of the torque transmitting cables within these flexible drive shafts. The use of relatively short flexible drive shafts also facilitates removal and replacement of the transfer die mechanism in the presses.

Thus it will be seen that the present invention eliminates the need for a costly and complicated operating drive connection between the crankshaft or other moving member on the press with a transfer die mechanism. Since the transfer die mechanism and its drive assembly are mounted as a composite unit on the base plate 22, the utilization of a flexible drive shaft extending from the drive of the press to the drive of the transfer mechanism adapts the transfer die mechanism for use on a plurality of different presses and adapts a single press for use with a plurality of transfer die mechanisms without costly alterations for accommodating the transfer die mechanism to the press or vice versa.

I claim:

1. In combination a press having a rotary shaft thereon which is driven at a speed corresponding to the speed of the press, a base plate, means removably mounting said base plate on said press, a transfer die mechanism mounted on the base plate so as to be removable intact from said press by removing said mounting means, said transfer die mechanism including a die having a plurality of regularly spaced stations and a transfer mechanism, said transfer mechanism including a carriage reciprocable on said base plate and work-gripping fingers bodily movable with the carriage and reciprocable thereon for movement to and from work-gripping positions so as to index workpieces successively through said regularly spaced stations of the die, means for reciprocating said carriage and actuating said finger including a rotary shaft on said base plate having one end operatively connected with said transfer mechanism and drive means operatively interconnecting the other end of said rotary shaft with the rotary driven shaft of the press, said drive means comprising a flexible drive shaft of the type having a flexible outer casing and a flexible torque transmitting core, means operatively connecting one end of the flexible drive shaft with the rotary driven shaft of the press and means operatively connecting the other end of the flexible drive shaft with said other end of the rotary shaft on said base plate.

2. The combination called for in claim 1 wherein said other end of the rotary drive shaft of the transfer mechanism is supported on said base plate.

3. The combination called for in claim 1 wherein said last-mentioned means provide a readily detachable connection between said flexible drive shaft and said rotary drive shaft of the transfer mechanism.

4. The combination called for in claim 1 wherein said means operatively connecting said one end of the flexible drive shaft with the rotary shaft of the press includes a rigid shaft journalled on said press and having one end operatively connected with the rotary shaft of the press and its other end connected with said one end of the flexible drive shaft, said rigid shaft extending from adjacent the rotary shaft of the press to adjacent said other end of the rotary drive shaft of the transfer mechanism.

5. The combination called for in claim 4 wherein the rotary shaft of the press comprises a crankshaft journalled on the press adjacent the upper end of the press and said base plate is mounted on a work supporting bed on the press at a level substantially below the crankshaft, said rigid shaft extending downwardly on the press with its lower end terminating adjacent the level of said base plate, said one end of the flexible drive shaft being connected with the lower end of said rigid shaft.

6. In combination a press having a rotary shaft driven at a speed proportional to the speed of the press, a transfer mechanism, means removably mounting said transfer mechanism on said press, said transfer mechanism including a reciprocable carriage and a plurality of work-gripping members bodily movable with the carriage and reciprocable thereon for movement to and from work-gripping positions, means for reciprocating said carriage and for actuating said fingers including a rotary shaft on the transfer mechanism and drive means including a flexible drive shaft of the type having a flexible outer casing and a flexible torque transmitting core, means operatively connecting one end of said flexible drive shaft to said rotary driven shaft of the press and the opposite end thereof to said rotary shaft on the transfer mechanism whereby said transfer mechanism may be removed from the press for application to another press by disconnecting said mounting means and disconnecting either of said operative connections.

7. The combination called for in claim 6 wherein the press includes a vertically reciprocating ram and said rotary driven shaft comprises a crankshaft for reciprocating said ram.

8. The combination called for in claim 7 wherein the press includes a bed plate and said transfer mechanism includes a base plate mounted on the bed plate of the press.

9. The combination called for in claim 6 wherein said flexible drive shaft rotates the rotary shaft of the transfer mechanism at the same speed as the driven rotary shaft of the press.

10. The combination called for in claim 6 wherein the operative connection between said one end of the flexible drive shaft and the rotary shaft of the press includes a rigid shaft journalled on said press and extending thereon from adjacent said rotary driven shaft to adjacent said rotary shaft of the transfer mechanism.

References Cited

UNITED STATES PATENTS

| | | | |
|---|---|---|---|
| 2,662,412 | 12/1953 | Miller | 74—15.63 |
| 3,011,464 | 12/1961 | Danly | 72—405 |
| 3,079,817 | 3/1963 | Sanford | 72—405 |
| 3,105,399 | 10/1963 | Strugala | 72—405 |
| 3,369,387 | 2/1968 | Bradlee | 72—421 |

CHARLES W. LANHAM, Primary Examiner

G. P. CROSBY, Assistant Examiner

U.S. Cl. X.R.

72—421; 74—15.63